L. J. BLACK.
STEAM FEED.
APPLICATION FILED MAY 26, 1911.
1,004,621.
Patented Oct. 3, 1911.
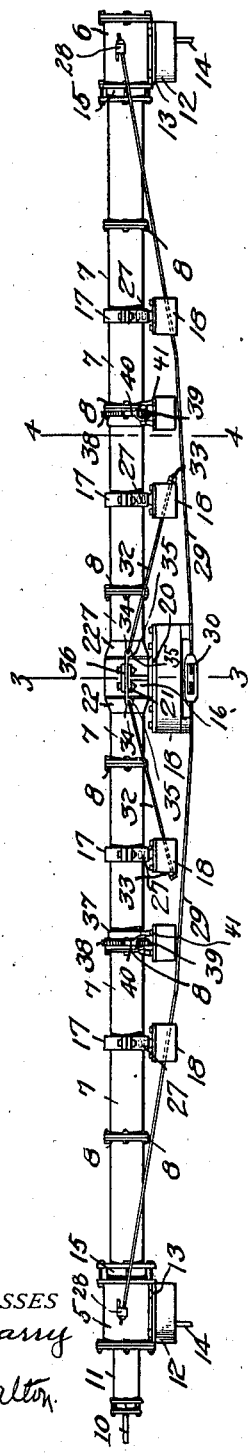
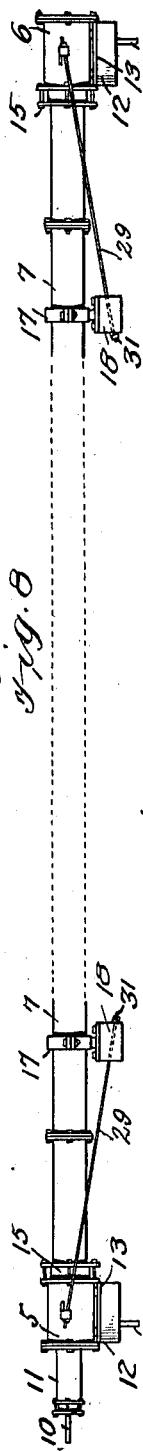
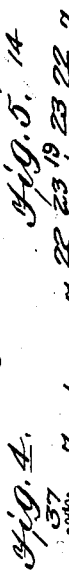
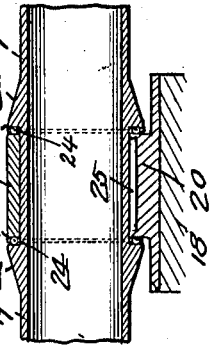
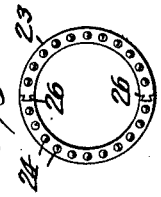
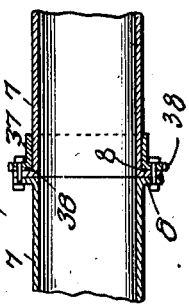
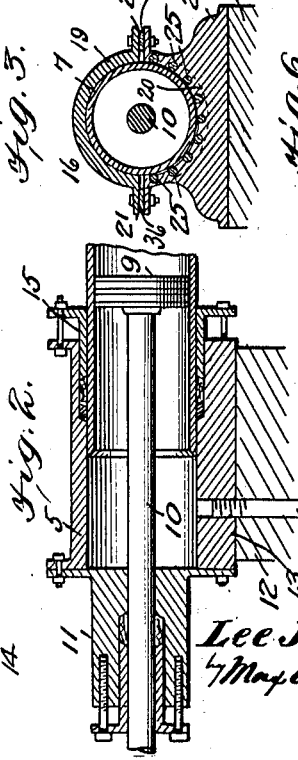
WITNESSES
H. E. Barry
A. R. Walton
INVENTOR
Lee J. Black
by May A. Schmidt
Attorney

UNITED STATES PATENT OFFICE.

LEE J. BLACK, OF BEAUMONT, TEXAS.

STEAM-FEED.

1,004,621.                 Specification of Letters Patent.           Patented Oct. 3, 1911.

Application filed May 26, 1911. Serial No. 629,638.

*To all whom it may concern:*

Be it known that I, LEE J. BLACK, a citizen of the United States, residing at Beaumont, in the county of Jefferson and State of Texas, have invented certain new and useful Improvements in Steam-Feeds, of which the following is a specification.

This invention relates to that class of steam cylinders for sawmill carriage feeds characterized by stationary end portions and an intermediate rotatable portion, the purpose of the rotatable portion being to equalize the wear resulting from the sagging of the piston rod.

It is the object of the present invention to provide an improved cylinder structure which permits longitudinal expansion and contraction, and, furthermore, to provide an improved support for the cylinder whereby it is rigidly held in place, without, however, interfering with the aforesaid expansion and contraction.

A further object of the invention is to provide a support for the rotatable section which permits said section to be easily turned.

Other objects and advantages of the invention will be apparent from the detailed description appearing hereinafter, and in order that the invention may be better understood, reference is had to the accompanying drawing forming a part of this specification.

In the drawing—Figure 1 is an elevation of the cylinder. Fig. 2 is a central longitudinal section of one end of the cylinder. Figs. 3 and 4 are cross sections on the lines 3—3 and 4—4, respectively, of Fig. 1. Fig. 5 is a longitudinal section of the center bearing. Fig. 6 is a section on the line 6—6 of Fig. 4. Fig. 7 is an elevation of the thrust bearing. Fig. 8 is an elevation, partly broken away, of a modification.

Referring specifically to the drawing, 5 and 6 denote, respectively, the stationary sections at the ends of the cylinder. The intermediate portion of the cylinder consists of several sections 7 according to the length of the cylinder, said sections being connected by end flanges 8 which are bolted together. In the cylinder operates a piston 9 which has its rod 10 connected to the sawmill carriage (not shown). The stationary section 5 has a suitable stuffing box 11 for the piston rod, and this section, as well as the section 6 are rigidly mounted on foundation timbers 12, they being formed with feet 13 which are bolted to said timbers. Steam is supplied alternately to the ends of the cylinder by pipes 14, the latter being connected, respectively, to passages in the feet 13, said passages opening into the cylinder sections 5 and 6. The ends of the intermediate portion of the cylinder enter the sections 5 and 6 through stuffing boxes 15 and said ends enter with a sliding fit. An expansion joint is thus provided which permits the intermediate portion of the cylinder to expand and contract in the direction of its length.

The cylinder has a center bearing 16 and intermediate bearings 17 on both sides thereof. These bearings are bolted or otherwise rigidly fastened to foundation timbers 18. The center bearing comprises upper and lower halves 19 and 20, respectively, having outstanding flanges 21 at their ends which are bolted together. This bearing is located between two circumferential flanges 22 on the center section 7. Between these flanges and the ends of the bearing are anti-friction balls 23 carried by rings 24. The lower half 20 of the bearing has longitudinal grooves in which seat anti-friction rollers 25. The grooves are closed at their ends to prevent the rollers from slipping out of place endwise.

The center bearing herein described provides a rigid support for the center of the intermediate portion of the cylinder, and at the same time renders said portion easy to rotate, the end thrust being taken up by the balls 23. The ball retaining rings 24 are in two sections connected by a dovetail joint 26 as shown in Fig. 6. The bearings 17 are also provided with anti-friction rollers 27, but no thrust bearings are provided, as there is no end thrust to cause friction. The sections 7 work loosely in the bearings 17 and are free to rotate therein, as well as to move endwise under expansion or contraction.

On the outside of the sections 5 and 6, on both sides thereof, slightly above the center, are cast lugs 28 to which are connected one of the ends of stay rods 29 which extend inwardly in the direction of the length of the cylinder, and are connected, under the timber 18 of the center bearing, by a turn buckle 30. The rods extend downwardly from the lugs and pass through the timbers 18 of the intermediate bearings which are nearest to the end sections 5 and 6, and thence pass downwardly under the timbers of the other intermediate bearings and the center bearing. Fig. 8 shows a slightly different arrangement of stay rods, said rods extending only as far as the timbers of the first intermediate bearing, through which they pass. The rods are secured to the timbers by bolts 31. The arrangement of stay rods herein described effectively serves to sustain the end thrust and the end sections are rigidly held in place.

In order to prevent any possibility of the center bearing moving in any direction, said bearing is also provided with stay rods 32 which extend downwardly from both sides thereof, and in opposite directions, lengthwise of the cylinder, to the timbers 18 of the next intermediate bearing, to which latter they are secured by bolts 33. The other ends of these stay rods are connected by eyes 34 to hooks 35 on the ends of plates 36 which are clamped between the flanges 21.

The following means are provided for rotating the intermediate portion of the cylinder: One of the sections 7, adjacent to one of its flanges 8, is encircled by a ring 37 which has an outstanding toothed flange 38, which latter engages the flange 8 and is secured by the same bolts which connect said flange to the flange of the adjacent section 7. The toothed flange is engageable by a pinion 39 which is operated by a ratchet lever 40, mounted on a stand 41. A second toothed ring and ratchet operating device is located on the other side of the center bearing.

I claim:

1. A steam cylinder comprising an intermediate rotatable section and stationary sections at each end thereof, a piston working in the cylinder, means for rotating the intermediate section, an expansion joint between the intermediate section and the stationary sections, stay rods connected at one of their ends to the sides of the stationary sections and extending inwardly in the direction of the length of the cylinder, and supporting means for the other ends of the stay rods.

2. A steam cylinder comprising an intermediate rotatable section and stationary sections at each end thereof, a piston working in the cylinder, means for rotating the intermediate section, an expansion joint between the intermediate section and the stationary sections, stay rods connected at one of their ends to the sides of the stationary sections and extending inwardly in the direction of the length of the cylinder, supporting means for the other ends of the stay rods, a bearing for the central portion of the rotatable section, stay rods connected at one of their ends to the sides of said bearing and extending therefrom in opposite directions and in the direction of the length of the cylinder, and supporting means for the other ends of the last-mentioned stay rods.

3. A steam cylinder comprising an intermediate rotatable section and stationary sections at each end thereof, a piston working in the cylinder, means for rotating the intermediate section, an expansion joint between the intermediate section and the stationary sections, a bearing for the central portion of the rotatable section, said bearing having upper and lower sections provided with bolting flanges, a plate clamped between said flanges and having hooks at its ends, stay rods connected at one of their ends to the hooks and extending therefrom in opposite directions and in the direction of the length of the cylinder, and supporting means for the other ends of the stay rods.

4. A steam cylinder comprising stationary end sections and a rotatable intermediate section, a ring encircling the intermediate section and having an outstanding toothed flange, a flange on the section opposite the toothed flange, fastening means passing through said flanges, and means engageable with the toothed flange for rotating the intermediate section.

In testimony whereof I affix my signature in presence of two witnesses.

LEE J. BLACK.

Witnesses:
CHAS. T. WILL,
CARR P. COLLINS.